United States Patent Office 3,564,052
Patented Feb. 16, 1971

3,564,052
PREPARATION OF CALCIUM PANTOTHENATE AND ITS DOUBLE SALTS
Myer Freed, Chicago, Ill., assignor to Daw's Laboratories, Inc., Chicago, Ill., a corporation of Illinois
No Drawing. Filed Nov. 13, 1962, Ser. No. 237,339
Int. Cl. C07c 99/04, 101/30
U.S. Cl. 260—534    4 Claims

ABSTRACT OF THE DISCLOSURE

This invention relates to the preparation of calcium pantothenate and to the double salts of pantothenate as represented by the compound calcium pantothenate chloride.

---

Beta alanine is incapable of being reacted directly with pantoyl lactone to form pantothenic acid. To the present, it has been necessary either to supply the beta alanine as a salt or ester or else make use of a third component in the reaction which is capable of forming a salt with the beta alanine. For this purpose, use has been made of various amines as a third component employed in the reaction in stoichiometric amounts to produce an amine salt of pantothenic acid, as defined in U.S. Pat. No. 2,496,363. When the amine salt is formed, further processing steps are required to remove the amine and for reaction to produce the calcium pantothenate which finds wide use as a vitamin.

When use is made of only two components in the reaction, the beta alanine is employed as a preformed salt, usually in the form of the calcium salt, thereby to enable reaction with the pantoyl lactone for direct formation of the calcium pantothenate. In order to obtain a satisfactory high yield, the calcium beta alanate is reacted with the pantoyl lactone under anhydrous conditions since the calcium beta alanate is strongly alkaline and thus capable of causing hydrolysis of the pantoyl lactone in the presence of moisture to form a non-reactive calcium pantoate salt while, at the same time, also forming an equally non-reactive free beta alanine. Even the amount of moisture that is formed by reaction of beta alanine with calcium hydroxide or calcium oxide in non-aqeous medium to form the corresponding calcium beta alanate is sufficient to cause substantial reduction in the yield of calcium pantothenate. It has, therefore, been the practice to produce the calcium beta alanate from calcium hydroxide or calcium oxide followed by dehydration to form a dry calcium beta alanate which is reduced to fine particle size for addition in an anhydrous medium for reaction with the pantoyl lactone. This, of course, is a rather laborious and expensive procedure which requires additional handling and equipment and the consumption of additional power for the removal of moisture and for grinding the salt and for presentation of the formed salt under anhydrous conditions.

It is an object of this invention to provide a method and means for the direct production of calcium pantothenate and the double salt of calcium pantothenate in high yields from beta alanine and pantoyl lactone and it is a related object to provide a process for the production of same wherein small amounts of moisture are not deleterious to the efficient and economical production of the desired end product in high yield, in which the product can be produced directly from the ingredients without first having to form the salt of beta alanine, and in which the end product is easily separable from the reaction product to provide a low cost and efficient means for production.

It has been found, in accordance with the practice of this invention, that the reaction to form calcium pantothenate directly from beta alanine and pantoyl lactone can be achieved when the reaction is carried out in the presence of calcium carbide. The medium for reaction is preferably anhydrous but a medium containing slight amounts of moisture can be used without noticeable interference with the reaction to produce the desired end product. The reaction is believed to be one wherein the beta alanine is reacted in situ to give off acetylene and calcium beta alanate as it is required for reaction with the pantoyl lactone.

For the anhydrous or nearly anhydrous medium, use can be made of a non-reactive solvent in which the ingredients are soluble. For this purpose, use can be made of an alcohol such as methanol, ethanol, propanol, butanol, and the like, but, for practical purposes, it is preferred to make use of a lower alcohol which can be more easily eliminated by evaporation. Use can also be made of alcohol ethers such as ethylene glycol monoethyl ether, ethylene glycol monomethyl ether, and the like. The amount of diluent is not critical. It is desirable to make use of an amount sufficient to take the ingredients into solution and to provide a system which is sufficiently fluid for filtration.

The beta alanine and the pantoyl lactone are preferably employed in stoichiometric amounts, that is, 89 parts by weight of beta alanine and 130 parts by weight of pantoyl lactone, although an excess of one over the other may be employed for driving the reaction in the direction to insure more complete utilization of the ingredient which may be of higher cost but it is undesirable to make use of an excess greater than 10 percent of one ingredient over the equimolecular proportion of the other. Any excesses of beta alanine would be insoluble and thus removed by filtration. Excess of the lactone is less desirable since it remains in solution.

The calcium carbide can be reacted in an amount within the range of one-third to one-half mole per mole of beta alanine. When expressed in terms of parts by weight, the calcium carbide is employed in an amount corresponding to 10 parts by weight per 45 parts by weight of beta alanine as a minimum. A clear maximum for the amount of calcium carbide need not be set forth since any amounts in excess of that capable of entering into the reaction can be employed in view of the fact that the excesses will remain insoluble in the system and will therefore be filtered off. However, it is impractical to make use of an amount of calcium carbide beyond a 50 percent excess of an equivalent weight per equivalent weight of beta alanine. In the preferred practice, the amount of calcium carbide will range from 10–20 parts by weight of calcium carbide per 44 parts by weight of beta alanine and 66 parts by weight of d,1-pantoyl lactone.

The reaction is carried out with stirring at elevated temperature, preferably at reflux temperature. The small amount of dark solid which may be formed in the reaction, consisting of the excess calcium carbide and/or excess beta alanine or other insoluble impurities, can be filtered from the solution. The filtrate is dried or precipitated or crystallized in any conventional manner to produce the calcium pantothenate.

When it is desired to produce the double salt, a stoichiometric amount (an equivalent per equivalent of the pantothenate salt) of calcium chloride is added to the filtrate and heated above 50° C. for about one hour. The double salt of calcium pantothenate chloride will precipitate from the solution. After cooling, the precipitate can be separated by filtration, centrifiguration or the like means for separating a solid from a liquid, followed by drying and washing. The double salt is obtained in high purity in nearly quantitative yield.

EXAMPLE 1

In a 1 liter three-necked flask, fitted with stirrer and reflux condenser, a mixture of 16 grams calcium carbide, 45 grams beta alanine, 66 grams d,l-pantoyl lactone and 155 cc. of methanol were introduced, vigorously stirred and heated to reflux for 4 hours. By this time, all the crystals of beta alanine were dissolved. The mixture was filtered hot to remove any dark insoluble materials and the yellow syrupy filtrate was dried in vacuum to a brittle, spongy mass which was easily crushed to a white powder. The product weighed 100 grams and assayed as 208 grams d-pantothenic acid per pound, or 100% calcium d,l-pantothenate.

EXAMPLE 2

In a 1 liter three-necked flask, fitted with stirrer and reflux condenser, 20 grams of calcium carbide, 40 grams of beta alanine, 66 grams of d,l-pantoyl lactone and 155 cc. of methanol were introduced and reacted in accordance with the procedure set forth in Example 1. Dry product weighed 125 grams and assayed 203 grams d-pantothenic acid per pound, or 98% of theory.

EXAMPLE 3

In a 1 liter three-necked flask equipped with reflux condenser and mechanical stirrer, 10 grams of calcium carbide, 45 grams of beta alanine, 66 grams of d,l-pantoyl lactone and 300 cc. of ethanol were introduced and refluxed until the crystals of beta alanine were dissolved. The reaction mixture was then filtered to remove any undissolved black residue.

To the filtrate there was added 56 grams of anhydrous calcium chloride and the mixture was heated to 60° C. for one hour and with mechanical stirring. A heavy precipitate formed which was filtered off and the filter cake was washed with methanol and then dried in vacuum at 60° C. The dried precipitate, corresponding to 145 grams of calcium pantothenate chloride, assayed 196 grams d-pantothenic acid per pound, or a yield of 99% of theory.

It will be apparent from the foregoing that I have provided a simple and efficient means for the preparation of calcium pantothenate and its double salt directly from beta alanine and pantoyl lactone and that the process described is capable of being carried out to produce high yield, even in the presence of moisture.

It will be understood that changes may be made in the details of formulation and processing without departing from the spirit of the invention, especially as defined in the following claims. For example, it would be an obvious variation to react in stages, as by reacting calcium carbide and beta alanine first, to form calcium beta alanate, and then adding pantoyl lactone and reacting further.

I claim:

1. The process for the production of calcium pantothenate consisting of reacting in a single reaction step and under substantially anhydrous conditions, beta alanine, pantoyl lactone and calcium carbide in a non-reactive solvent which is present in an amount to take the materials into solution, with the beta alanine and pantoyl lactone being present in the ratio of 89 parts by weight of beta alanine to 130±13 parts by weight of pantoyl lactone, and in which the reaction is carried out at an elevated temperature above room temperature up to reflux temperature.

2. The process for the production of calcium pantothenate consisting of reacting in a single reaction step and under substantially anhydrous conditions, beta alanine, pantoyl lactone and calcium carbide in a non-reactive solvent which is present in an amount to take the materials into solution, with the beta alanine and pantoyl lactone being present in the ratio of 89 parts by weight of beta alanine to 130±13 parts by weight of pantoyl lactone, and with the calcium carbide present in the ratio of ⅓ to ½ mole of calcium carbide to one mole of beta alanine and in which the reaction is carried out at an elevated temperature above room temperature up to reflux temperature.

3. The process for the production of calcium pantothenate consisting of reacting in a single reaction step and under substantially anhydrous conditions, beta alanine, pantoyl lactone and calcium carbide in a non-reactive solvent which is present in an amount to take the materials into solution, with the beta alanine and pantoyl lactone being present in the ratio of 89 parts by weight of beta alanine to 130±13 parts by weight of pantoyl lactone, and with the calcium carbide present in an amount of at least 10 parts by weight calcium carbide to 45 parts by weight beta alanine.

4. The process for the production of calcium pantothenate-chloride double salt consisting of reacting in a single reaction step and under substantially anhydrous conditions beta-alanine, pantoyl lactone and calcium carbide in a non-reactive solvent which is present in an amount to take the materials into solution, with the beta-alanine and pantoyl lactone being present in the ratio of 89 parts by weight of beta-alanine to 130±13 parts by weight of pantoyl lactone and with the calcium carbide present in the ratio of ⅓ to ½ mol of calcium carbide to 1 mol of beta-alanine and in which the reaction is carried out at elevated temperature within the range of room temperature to reflux temperature and in a subsequent reaction adding calcium chloride to the reaction product to produce the calcium pantothenate-chloride double salt.

References Cited

UNITED STATES PATENTS

| | | | |
|---|---|---|---|
| 2,957,025 | 10/1960 | Brooks | 260—534AUX |
| 2,848,489 | 10/1958 | Kagan | 260—534AUX |
| 2,845,456 | 7/1958 | Kagan | 260—534AUX |
| 2,390,499 | 12/1945 | Carlson | 260—534AUX |

FOREIGN PATENTS

| | | | |
|---|---|---|---|
| 420,229 | 4/1947 | Italy | 260—534A |
| 1,041,967 | 10/1958 | Germany | 260—484 |

JAMES A. PATTEN, Primary Examiner

J. L. DAVISON, Assistant Examiner